2,818,423
Patented Dec. 31, 1957

2,818,423
RECOVERY OF HCN TETRAMER

Don E. Carter, Dayton, Ohio, assignor to Monsanto Chemical Company, St. Louis, Mo., a corporation of Delaware No Drawing. Application October 28, 1955
Serial No. 543,601

12 Claims. (Cl. 260—465.5)

This invention relates to the recovery of the tetramer of hydrogen cyanide from the material obtained by polymerization of hydrogen cyanide.

Hydrogen cyanide tetramer, also referred to herein as HCN tetramer or as tetramer, is a known chemical compound, having the empirical formula $(HCN)_4$ and the probable structural formula:

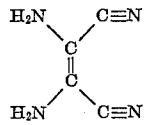

This material can be called diaminomaleinitrile, although there is evidence that if often reacts as the imino-modification. The tetramer can be reacted with glyoxal to form 2,3-dicyanopyrazine.

It has been pointed out in the literature that the polymerization of hydrogen cyanide can take various courses. The particular course followed is greatly dependent upon the reaction conditions and environment. The classical catalyst employed for preparing the tetramer is potassium cyanide (KCN). An important objection is the low proportion of tetramer in the total polymer formed. When hydrogen cyanide is polymerized in the presence of water, little or no tetramer is formed. The polymerization of anhydrous liquid hydrogen cyanide can also be catalyzed by a number of other catalysts. As disclosed in my copending application, Serial No. 388,670, filed October 27, 1953, now U. S. Patent No. 2,722,540, of which the present application is a continuation-in-part, improvements in the proportion of tetramer present in the total polymer can be obtained through the use of a quaternary ammonium hydroxide as catalyst. However, even then a considerable proportion of polymeric material other than the tetramer is found in admixture with the tetramer.

An object of the present invention is to provide a method for the separation of HCN tetramer from HCN polymer containing same. Another object is to provide a process of selective extraction for accomplishing the said separation. Yet another object is to provide a class of liquid organic solvents in which HCN tetramer is preferentially soluble in the presence of the other components of total HCN polymer. Yet another object is to provide such solvents which are not only highly selective for HCN tetramer but also have a high solvent capacity for HCN tetramer. Yet another object of the invention is to provide selective solvents for HCN tetramer which do not react with the tetramer during extraction and recovery procedures. Other objects and advantages of the invention will be apparent to one skilled in the art from the accompanying disclosure and discussion.

The essence of the present invention lies in the use of liquid aliphatic nitriles as selective solvents to recover HCN tetramer from HCN polymer containing said tetramer. The nitriles have a solvent capacity for HCN tetramer much higher than most other organic solvents. It is therefore quite surprising that the nitriles are also selective for HCN tetramer in the presence of total HCN polymer, as a good solvent for HCN tetramer could be expected also to be a good solvent for the other polymers of HCN. In extraction processes it is of course highly desirable to have a solvent which exhibits both good selectivity and good solvent capacity for the material to be extracted. My discovery that the liquid aliphatic nitriles are highly selective for the tetramer in addition to having a high capacity for the tetramer, thus provides a highly efficient and economical procedure for separating tetramer from total polymer.

These factors are illustrated in the following specific examples, wherein the selectivity, and the solvent capacity, of acetonitrile, propionitrile and butyronitrile, are shown in comparison with diethyl ether, methanol, and ethanol, all the data being obtained under comparable conditions. It will be appreciated, of course, that variations in the proportion of polymer to solvent, the temperature, and other details of these examples can be made without departing from the invention.

Examples 1–6

Liquid anhydrous hydrogen cyanide was polymerized by charging 525 g. anhydrous hydrocyanic acid, i. e., hydrogen cyanide, and 5.1 g. tri-n-butylamine catalyst to a stainless steel tube of 2 inch diameter and 20 inch length which was closed at one end. Low boiling materials had been removed from the HCN by fractional distillation and the HCN had been dried by distillation through calcium sulfate.

The tube was placed upright in a water bath thermostated at $18° \pm 2°$ C., stoppered, and vented through a tube containing calcium sulfate. After six days the liquid remaining in the tube was decanted and the polymer in the tube collected. The HCN remaining in the polymer was allowed to evaporate. The weight of dry polymer remaining was 103 g. Its tetramer content was approximately 15 weight percent.

Single-stage extractions of total HCN polymer prepared as just described, were effected with several solvents. Five grams of the HCN polymer and 20 grams of each of the solvents listed below were weighed into clean tubes. The tubes were stoppered, shaken and placed in a water bath maintained $18° \pm 2°$ C. After 50 hours, during which time the tubes were shaken occasionally, 5 ml. aliquots of the supernatant liquid, i. e., of the extract phase, were withdrawn and evaporated into a stream of dry nitrogen to remove the solvent completely, leaving only polymer residue which consisted of the polymer which was dissolved in the liquid solvent. The residues were weighed, and their HCN tetramer contents determined by spectrophotometry.

| Example No. | Solvent | Residue (g.) | HCN Tetramer (Wt. Percent) | Tetramer (g.) In 5 ml. Aliquot of One Equilibrium Stage |
|---|---|---|---|---|
| 1 | Methanol [1] | 0.2631 | 27.1 | 0.0712 |
| 2 | Ethanol [1] | 0.1113 | 24.8 | 0.0277 |
| 3 | Diethyl ether | 0.0120 | 33.3 | 0.0040 |
| 4 | Acetonitrile | 0.1888 | 35.7 | 0.0674 |
| 5 | Propionitrile | 0.1730 | 41.2 | 0.0713 |
| 6 | n-Butyronitrile | 0.1444 | 57.5 | 0.0830 |

[1] Methanol acted differently from the other solvents, in that it left a residue much darker than that obtained from the other solvents, which residue was very difficult to purify by recrystallization. Thus, it appeared to extract something that the nitriles and diethyl ether did not extract. The same was true to a less noticeable extent with ethanol.

Of the solvents, methanol, ethanol, and diethyl ether, ethanol had the lowest selectivity for tetramer and only moderate solvent capacity. Methanol had the largest solvent capacity of any of the solvents, but its selectivity was only slightly above that of ethanol and additionally it appeared to extract an extremely dark colored material from the polymer which accordingly complicates further procedures for recovery of the tetramer. The selectivity of diethyl ether for tetramer was somewhat lower than that of the acetonitrile, and the quantity of polymer dissolved in diethyl ether was quite small. On the other hand, the solvent capacity of acetonitrile for polymer was more than 15 times greater than that of diethyl ether. Despite the good solvent capacity of acetonitrile for polymer, it was found to have good selectivity for the tetramer over other components of the polymer, better than methanol, ethanol, or diethyl ether. When one now considers propionitrile, its solvent capacity is somewhat less than that of acetonitrile, while its selectivity is higher. Butyronitrile has even less solvent capacity for the polymer, although still more than 10 times greater than that of diethyl ether, and its selectivity is extremely high, almost twice that of the selectivity of diethyl ether. Accordingly, butyronitrile is preferred for maximum efficiency. The last column of the table is obtained by multiplying the grams residue times the weight percent tetramer therein, thus giving the total weight of tetramer extracted by 5 ml. solvent under the experimental conditions, which are believed to have provided essentially equilibrium between polymer and solvent phases. It is seen that both propionitrile and butyronitrile are more efficient than acetonitrile, butyronitrile being most outstanding. All of these nitriles are tremendously more effective than is the diethyl ether. Additionally, one is not faced with the explosion hazards of diethyl ether. It should also be noted that the nitriles do not react with the tetramer during extraction, whereas certain other solvents mentioned in the prior art, particularly acetone, appear to so react. Although the efficiency (weight tetramer per unit amount of solvent) of methanol was the same as propionitrile, it is unsuited to selective extraction of tetramer because it also extracts an undesirable very dark fraction of the polymer.

Preferred solvents for use in the present invention are the saturated lower aliphatic nitriles, particularly those containing from 2 to 8 carbon atoms per molecule, the preferred group amongst these being those containing from 2 to 4 carbon atoms per molecule. It may be noted that the nitriles can also be described by use of the term "cyanide," i. e., acetonitrile is methyl cyanide, propionitrile is ethyl cyanide, etc. Thus, the preferred solvents can also be called the lower alkyl cyanides. Included are all of the various configurations of the carbon atoms in straight chains and branched chains. Thus, the 5-carbon atom nitriles include n-butyl cyanide, isobutyl cyanide, sec.-butyl cyanide, and tert.-butyl cyanide. While the saturated nitriles are preferred not only because of their high selectivity and solvent capacity but also because of availability and inertness thus facilitating recovery and re-use, it is not outside the broad scope of the invention to employ unsaturated nitriles, e. g., acrylonitrile, methacrylonitrile or dinitriles, or nitriles containing non-hydrocarbon groups that are essentially non-reactive with the components of the HCN polymer, e. g., succinonitrile, $\beta$-chloropropionitrile. It should be understood that the word "liquid" in the term "liquid aliphatic nitrile" merely means that the nitrile is liquid under the conditions of the extraction operation. Thus, a normally solid nitrile, i. e., one solid at ordinary room temperature (20° C.), can be used at higher temperatures at which it is a liquid. It should also be understood that mixtures of two or more nitriles can be employed as may be desired. Generally speaking, however, the use of a single nitrile simplifies solvent recovery steps.

The data given in the preceding specific examples are of course based on a single stage extraction, carried out under conditions such that approximate equilibrium between solid and liqiud phases was attained. Those skilled in the art of extracting components from solids by the use of liquid selective solvents are so fully familiar with the numerous manipulative procedures available to accomplish this that it would unduly lengthen the present specification to describe all of these in detail. Having had the advantage of the present disclosure, a suitable choice of manipulative procedures will readily be made to those skilled in the art, consistent with the amount of polymer which it is desired to extract and the equipment limitations which may be presented to a particular operator. For some uses, a single equilibrium stage might give an extract material sufficiently enriched in tetramer. However, it will generally be preferred to obtain the tetramer in either pure form or at least a more highly concentrated form than is possible in one equilibrium stage. In such event, resort will be had to the well-known techniques, for example countercurrent decantation or various of the other extraction procedures wherein extraction is effected in a plurality of stages. Thus, a single batch of polymer may be successively extracted with increments of fresh solvent, until tetramer has been removed from the polymer to as great an extent as is desired. In such operations, the first extract phase will contain extract material richest in tetramer, while the last extract phase will be highly contaminated with non-tetramer polymeric material. Any or all of the extract phases can be subjected to evaporation to remove solvent from the polymer content, or can be chilled to precipitate out polymer, or can have a non-solvent, e. g., hexane or benzene, added thereto to precipitate out ploymer. Polymer extracts thus obtained can be subjected to further extraction for further purification to as great an extent as is desired. The most efficient operation, so far as extracting tetramer from total polymer, is had by contacting polymer and solvent countercurrently in a plurality of stages, either as separate batch contactings or in any of the well-known apparatus for continuously countercurrently contacting solid with solvent. The solvent can be introduced into one end of a series of extraction and separation stages alternated with each other and passed continuously therethrough to the other end of the series, polymer meanwhile being introduced at said other end or at an intermediate point in the series and passed in the direction generally opposite to that of the solvent. Each contacting stage is followed by a separation stage from which solvent is then passed to a contacting stage farther along the line in the direction of flow of solvent while separated polymer is passed in the opposite direction in the line to the contacting stage from which the solvent had come. Polymer can be mechanically moved against a stream of flowing solvent, as by placing the polymer in perforated baskets or in a plurality of separate compartments having on each end a filter medium such as filter cloth and moved mechanically through a conduit opposite to the direction of flow of solvent. In any countercurrent scheme of extraction, it is possible with an extent of contact amounting to a sufficient number of theoretical equilibrium stages to recover undissolved polymer residue essentially completely stripped of tetramer. Solvent removed from the stage into which fresh total polymer is introduced will contain dissolved polymer which is richest in tetramer. Further enrichment can be obtained by passing such solvent countercurrent to further polymer beyond the point of entry of total polymer feed to the extraction process, this further polymer (other than the feed polymer) being supplied by introducing into the solvent just prior to its leaving the system, essentially pure tetramer and causing it to flow countercurrent to the solvent whereby a "backwash" or refluxing action is obtained. In this type of system, it is possible to recover a final extract phase containing essentially pure tetramer or extract material as rich in tetramer as desired, and at the opposite end of the system undissolved polymer residue containing essentially all the polymer components other than the tetramer. These, and many other variations which will be apparent to those skilled in the art, can be employed in practicing the invention.

The extraction can be effected over a comparatively wide range of temperatures, such as those ranging from just above the melting point of the nitrile solvent up to the boiling point of the nitrile solvent. Preferably the temperature will not exceed 150° C., since decomposition of tetramer is apt to set in at about 180° C. and higher. Generally, it may be stated that temperatures within the range of 10 to 80° C. are quite satisfactory, and ordinary room temperature will often be used, since it permits efficient extraction and avoids the expense of refrigeration or heating. While the extraction can be effected at pressures below or above atmospheric, there would seldom be sufficient advantage to warrant it.

While the invention has been described with particular reference to various preferred embodiments thereof, it will be appreciated that numerous modifications and variations are possible without departing from the invention.

I claim:

1. A process which comprises selectively extracting HCN tetramer from HCN polymer containing same, employing as solvent a liquid alkyl nitrile.
2. A process according to claim 1 wherein said nitrile is an alkyl cyanide containing four carbon atoms.
3. A process according to claim 1 wherein said nitrile is n-butyronitrile.
4. A process according to claim 1 wherein said nitrile is propionitrile.
5. A process according to claim 1 wherein said nitrile is acetonitrile.
6. A process according to claim 1 wherein said extracting is effected in a plurality of stages.
7. A process according to claim 6 wherein polymer and solvent are contacted countercurrently.
8. Method of separating HCN tetramer from HCN polymer containing said tetramer, which comprises intimately contacting said HCN polymer with a liquid alkyl nitrile, separating an undissolved polymer residue poor in tetramer from a liquid extract phase comprising said nitrile and dissolved polymer rich in tetramer, and recovering tetramer-rich product from said extract phase.
9. Method according to claim 8 wherein said nitrile is an alkyl cyanide containing four carbon atoms.
10. Method according to claim 8 wherein said nitrile is n-butyronitrile.
11. Method according to claim 8 wherein said nitrile is propionitrile.
12. Method according to claim 8 wherein said nitrile is acetonitrile.

References Cited in the file of this patent

UNITED STATES PATENTS

| 2,499,441 | Woodward | Mar. 7, 1950 |
| 2,722,540 | Carter | Nov. 1, 1955 |

OTHER REFERENCES

Bedel: Compt. Rend., vol. 176, pgs. 168–171 (1923).
Migrdichian: The Chemistry of Organic Cyanogen Compounds (1947), pgs. 349–350.